Nov. 1, 1966  R. BUSLAFF  3,281,927
TOOL FOR DILATING ELASTIC RINGS AND TUBES
Filed June 22, 1964  4 Sheets-Sheet 2
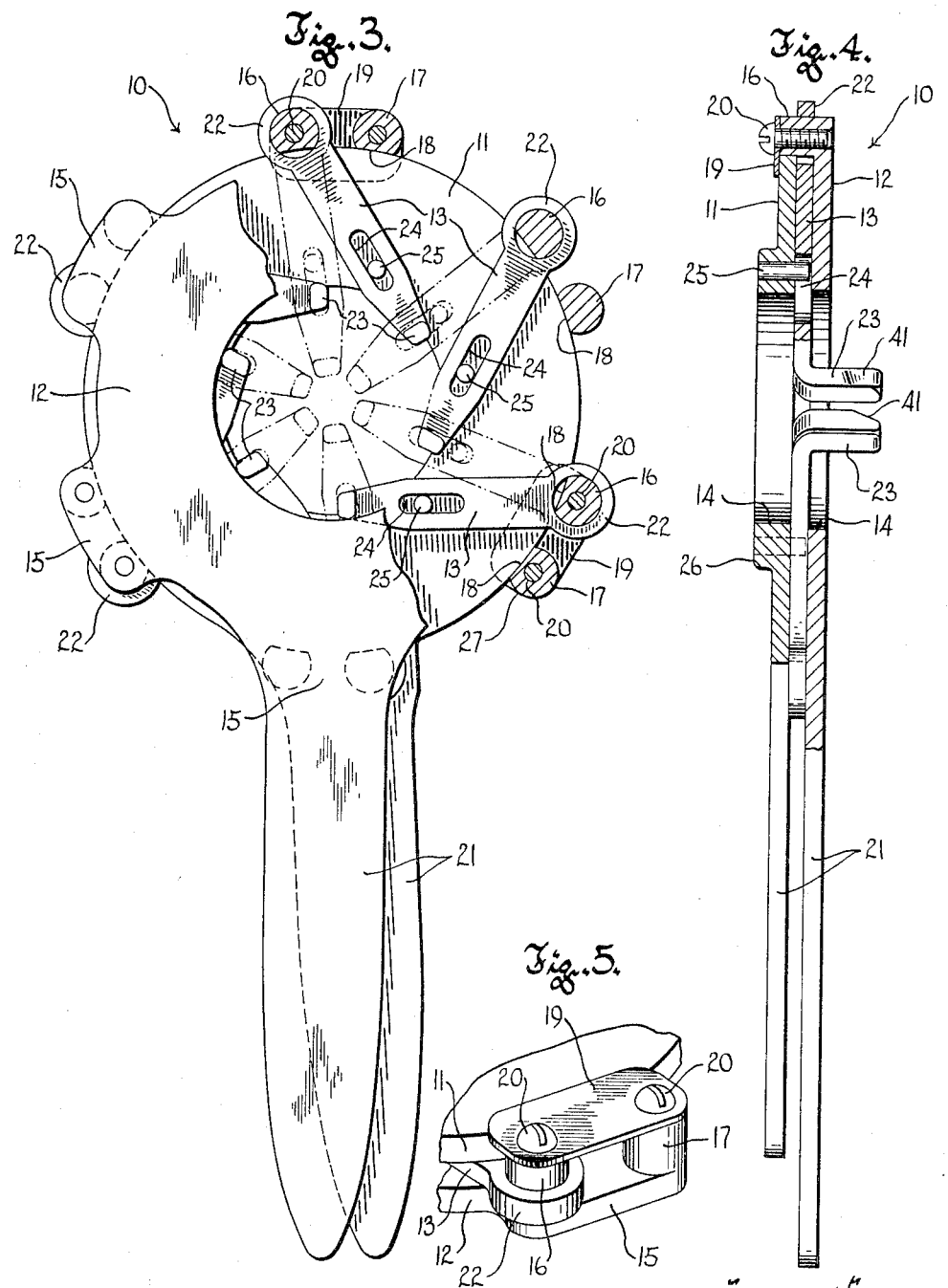

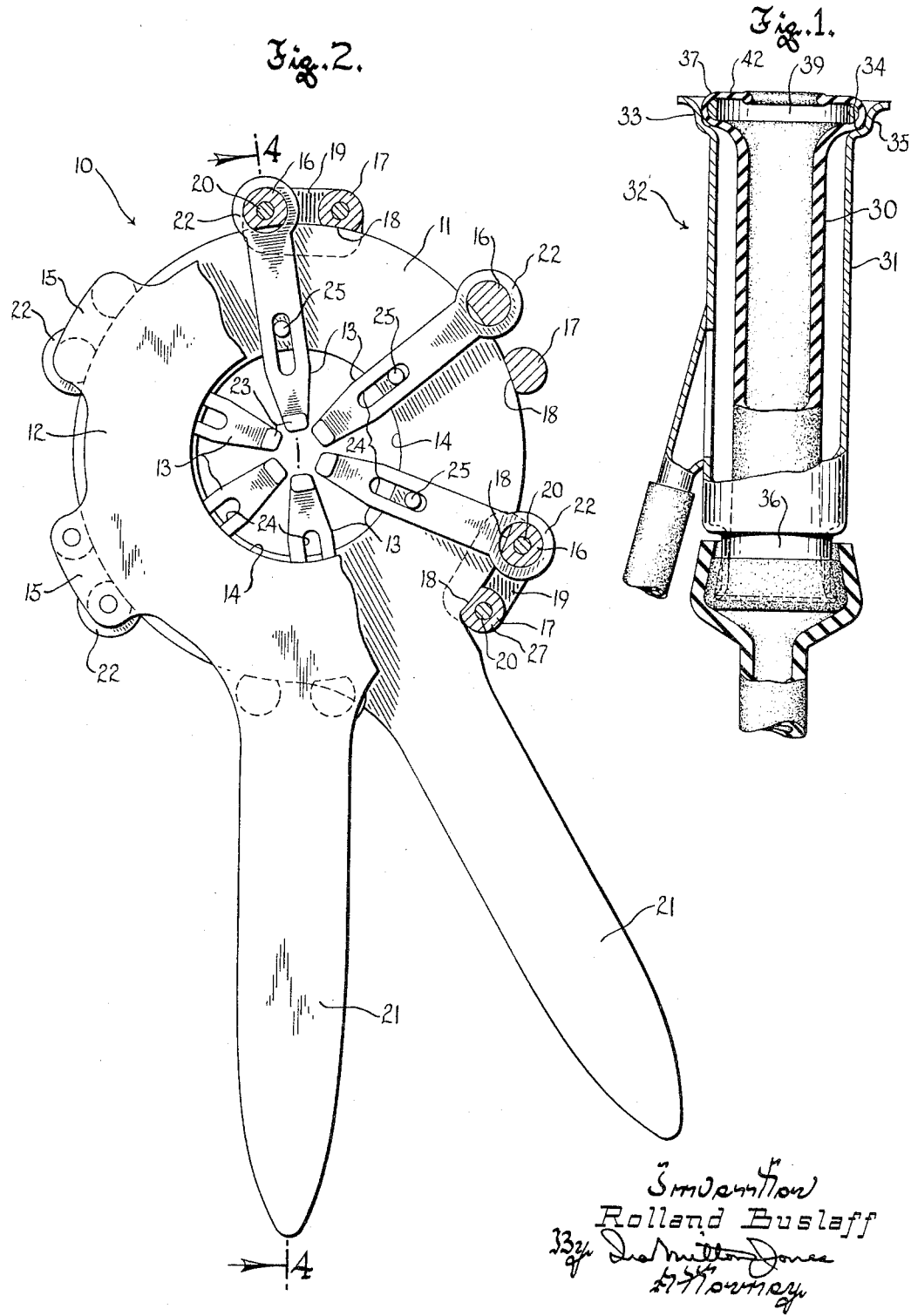

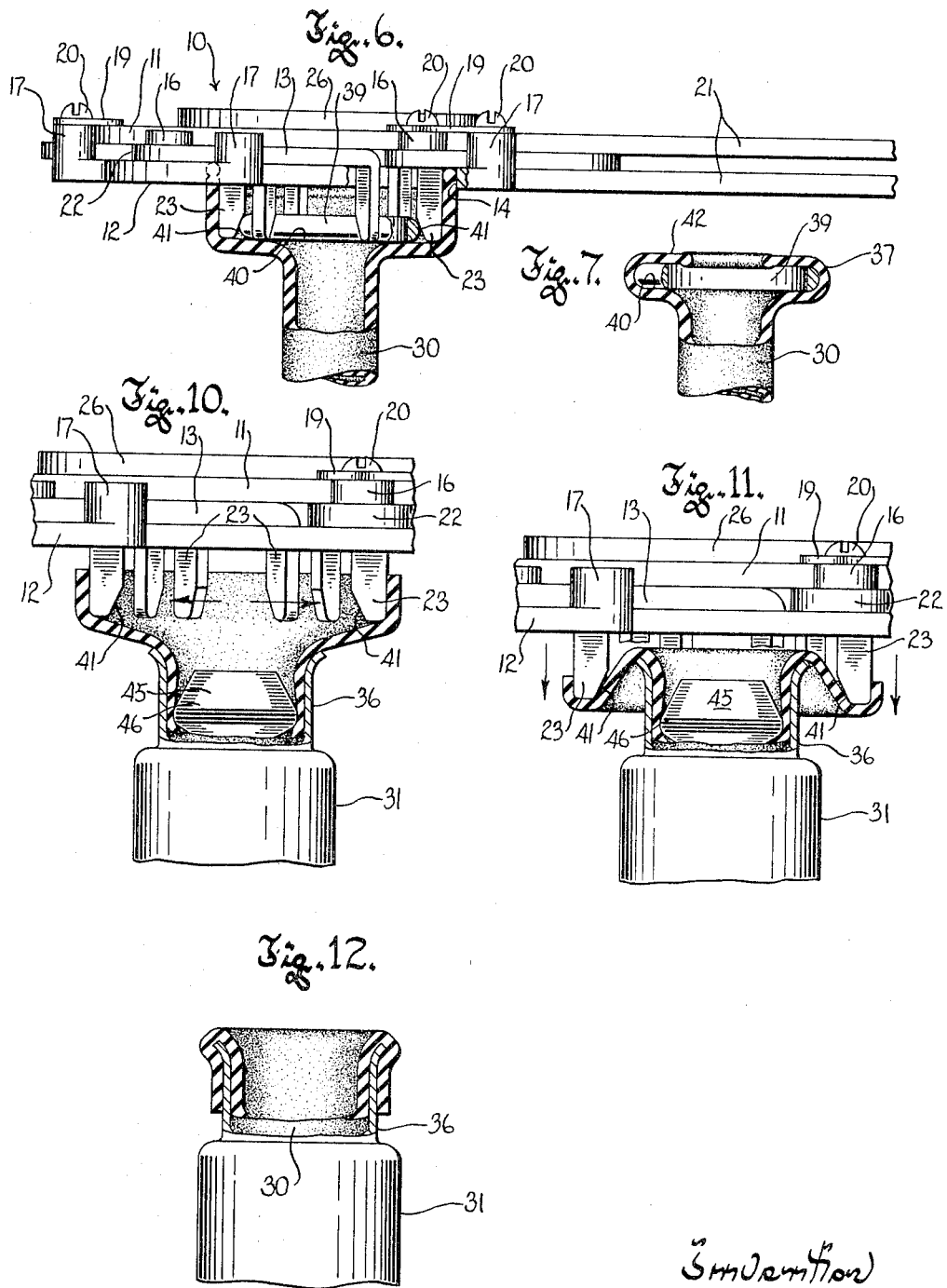

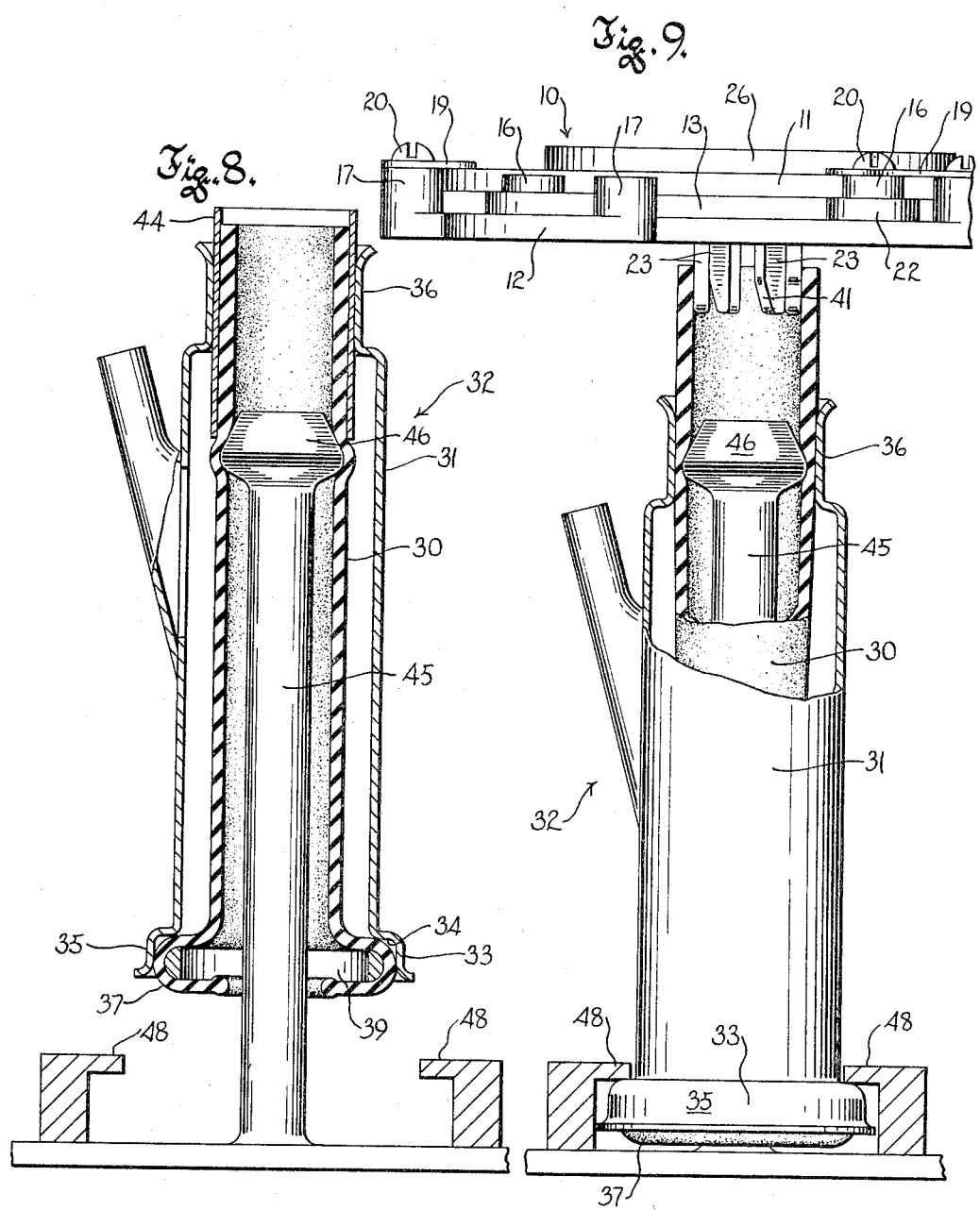

United States Patent Office 3,281,927
Patented Nov. 1, 1966

3,281,927
TOOL FOR DILATING ELASTIC RINGS
AND TUBES
Rolland Buslaff, W233 N671 Highway 164,
Waukesha, Wis.
Filed June 22, 1964, Ser. No. 376,637
8 Claims. (Cl. 29—235)

This invention relates to tools for dilating elastic articles, and has more particular reference to a hand operated tool for expanding such elastic articles as rubber rings and tubes to facilitate subassembly thereof with inelastic members of various devices.

While the tool of this invention can, for example, be advantageously employed for the application of "0" rings or similar valve stems and other cylindrical parts which are to be snugly encircled by the rings, it is ideally suited for the dilation of the end portions of elastic tubes to facilitate their assembly with rigid annular and/or tubular parts that must be tightly encircled by the end portions of the elastic tubes.

In a specific sense, it is the purpose of this invention to provide a hand operated tool which is particularly useful in the manufacture of teat cups for milking machines and to persons who must attend and service such machines.

As is well known, the teat cups of milking machines comprise a rigid metallic cylinder or outer shell, and a tubular liner of elastic material such as soft rubber confined within the outer shell, commonly termed an inflation.

It is essential to proper and efficient milking action, of course, that the end portions of the liner or inflation be secured to the ends of the outer shell by connections which effectively seal it to the wall of the shell and which hold the intermediate portions of the inflation stretched lengthwise and in radially spaced concentric relation to the surrounding wall of the shell.

For this purpose, the upper or receiving end of the cylindrical outer shell is formed with an enlarged circular rim portion that provides an annular seat substantially normal to the shell axis, and a skirt-like retaining flange encircling the seat. At its lower or delivery end, the outer shell is formed with a cylindrical wall portion that defines a coaxial neck of reduced diameter. The extremity of the neck is flared outwardly to a slight extent.

The liner or inflation has a metal expander ring inside its upper end portion, the purpose of which is to form a head on the inflation that fits within the circular rim portion on the shell to have its underside engage the seat therein. The lower end portion of the liner or inflation protrudes from the neck on the shell and is everted and stretched thereover so that the flare on the extremity of the neck holds the inflation against displacement. In order to maintain the head on its upper end in sealing engagement with the seat on the shell, the inflation is stretched lengthwise and tensioned at the time its lower end portion is everted and snapped over the neck of the shell.

From this it will be seen that the subassembly of the inflation with the outer shell of the teat cup requires both end portions of the inflation to be dilated. Its upper end is first expanded to approximately twice the diameter of the inflation to enable insertion of the expander ring thereinto. While this can be done before the inflation is inserted into the outer shell, it nevertheless has heretofore constituted a difficult and time consuming task involving the use of special although somewhat crude tools.

The second dilation, namely that of the lower end of the inflation to enable it to be everted and snapped over the neck to the bottom of the shell, is a much more difficult operation that is further complicated by the fact that it must be effected while the inflation is stretched lengthwise and in substantial tension. Before the inflation is stretched to bring the head on its upper end into sealing engagement with the annular seat in the top of the outer shell, the inflation does not protrude from the lower end of the shell. This makes it essential to apply stretching force to the interior of the inflation while it is in place within the outer shell, in order to effect elongation of the inflation the extent necessary to carry its lower end beyond the flared extremity of the neck on the shell and to enable eversion of the inflation end over the exterior of the neck.

The object of this invention, therefore, is to provide a hand operated tool by which the end portions of rubber tubes or inflations can be readily dilated to facilitate the application of an expander ring into one end of the inflation and to facilitate eversion of the other end portion of the inflation over the neck on a teat cup encircling the inflation.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a view partly in side elevation and partly in longitudinal section, of teat cup of conventional construction;

FIGURE 2 is a plan view of the hand operated dilating tool of this invention, parts thereof being broken away and shown in section, and illustrating the tool in its non-operating condition;

FIGURE 3 is a view similar to FIGURE 2 but showing the tool in its actuated or operating condition;

FIGURE 4 is a sectional view taken through FIGURE 2 on the plane of the line 4—4;

FIGURE 5 is a fragmentary perspective view illustrating a detail of construction of the tool;

FIGURE 6 is a side view of the tool illustrating how it is used to dilate one end of an inflation to facilitate insertion of an expander ring thereinto;

FIGURE 7 is a view partly in elevation and partly in section of the upper end of an inflation having its expansion ring in place therein;

FIGURE 8 is a view partly in elevation and partly in longitudinal section showing how the inflation must be elongated within the outer shell before its straight end portion can be everted and snapped into place around the neck of the shell;

FIGURE 9 is a view similar to FIGURE 8 showing the dilation means of the tool of this invention engaged in the fully projected end of the inflation but prior to dilation of the inflation;

FIGURES 10 and 11 are fragmentary views respectively showing the dilation of the inflation and the way in which the tool of this invention is employed to evert the dilated end portion around the neck of the outer shell; and FIGURE 12 is a fragmentary view of the necked end portion of the finished teat cup, with portions broken away and shown in section to illustrate how the everted end portion of the inflation tightly hugs the neck of the outer shell.

Referring now more particularly to the accompanying drawings, wherein like reference characters identify like parts throughout the views, the numeral 10 generally designates the body of the tool of this invention. The body is comprised of a pair of coaxial flatwise juxtaposed top and bottom annular disc-like members 11 and 12, respectively, and a number of levers, six being here shown, having substantially flat arms 13 slidingly confined between the disc-like members and serving to hold them in spaced apart relationship. Each of the disc-like members has a substantially large diameter central hole 14, and while these holes can be equal in diameter, the hole in the lower member 12 has been shown slightly larger than that in the upper member. One of the disc-like members, here shown as the lower one, provides a lever mounting disc, while the other member provides a lever actuating disc.

The discs are constrained to relative rotary motion about their common axis by connections remote therefrom so as not to obstruct the central holes in the discs. For this purpose, the lower or lever mounting disc 12 is formed with six circumferentially equispaced pads 15 which project outwardly from its periphery, beyond the cylindrical periphery of the upper or lever actuating disc. Each of these pads has a pair of spaced apart guide lugs 16 and 17 formed thereon and projecting upwardly therefrom in side by side relation directly alongside the periphery of the lever actuating disc 11. The sides of these lugs facing inwardly toward the axis of the discs are ground away to provide arcuate guiding surfaces 18 that are contiguous to the cylindrical periphery of the lever actuating disc and serve as bearings by which the actuating disc is journalled for rotary motion about the common axis of the discs. The lugs on alternate pads also have thin retainer plates 19 fixed to their extremities as by screws 20, and these plates overlie the outer face of the upper disc 11 to prevent axial separating motion of the discs.

From the description thus far, it will be seen that the lugs 16 and 17 and the plates 19 cooperate with the peripheral portions of the upper disc 11 to constrain the discs to relative rotary motion about their common axis. In order to enable such rotary motion to be manually imparted thereto, each of the discs is provided with an elongated handle 21 which projects radially from its periphery at a location adjacent to the handle on the other disc. The handle on the lever mounting disc can be formed as an integral extension of the pad 15 thereon, as shown.

It is a feature of the tool of this invention that the lugs 16 on the pads of the lever mounting disc 12 are formed to serve as pivot posts upon which the outer ends of the lever arms 13 are swingably supported for back and forth movement in the space between the discs. Accordingly, each of the levers has a hub portion 22 at one end freely encircling its pivot post 16.

The levers are identical, and the arm 13 of each is straight and extends inwardly from its pivot beyond the edges of the holes 14 in the discs. A finger 23 on the inner end of each lever arm projects downwardly therefrom, axially through the hole 14 in the lever mounting disc 12, and the extremities of all the fingers lie in a common plane normal to the disc axis and spaced a distance below the underside of the lever mounting disc.

Each of the lever arms 13 is provided with an elongated slot 24 intermediate its ends and extending lengthwise of the arm. Drive pins 25 fixed in the lever actuating disc project downwardly from its underside and into the slots 24 of the lever arms to impart swinging motion to the levers upon their pivot posts when either disc is rotated relative to the other disc. The drive pins 25 are mounted in a somewhat thicker hub portion 26 on the actuating disc, and they are located at such circumferentially equispaced locations thereon as to hold the lever arms in nonoperating positions radially of the disc axis when the discs are in one limit of rotary motion defined by the engagement of one edge of the handle on the lever actuating disc 11 with a stop 27 on the periphery of the lever mounting disc 12. As shown in FIGURE 2, the handle engaging stop 27 can be provided by one of the bearing lugs 17 on the lever mounting disc.

Relative motion between the discs in the opposite direction can be limited by the engagement of the lever fingers 23 with the edge of the hole 14 in the lever mounting disc 12. Preferably, the handles 21 are so located on the discs that they are nearly in superimposed relation at the time the fingers 23 engage the edge of the hole 14, as shown in FIGURE 3, and are angularly displaced from one another at the time the stop 27 is engaged by the handle on the lever actuating disc, as shown in FIGURE 2.

The tool is in a non-operating condition when its lever arms 13 extend radially inwardly from their pivots, as seen in FIGURE 2, and occupy positions at which their fingers 23 are substantially closely grouped about the disc axis, in circumferentially equispaced relation to one another and all spaced the same minimum distance from the disc axis. Rotation of the lever actuating disc 11 in the clockwise direction as seen in FIGURES 2 and 3, relative to the lever mounting disc 12, causes the lever arms 13 to be simultaneously swung in counterclockwise directions about their pivot posts to impart iris-like dilating motion to their fingers 23, to carry them to operating positions such as seen in FIGURE 3, at which the fingers are remotely grouped about the disc axis, equidistant therefrom, and circumferentially equidistant from one another. Similarly, relative rotary motion of the discs out of their operating positions seen in FIGURE 3 imparts iris-like contracting motion to the flanges 23.

Inasmuch as the handles 21 overlap to some extent when the discs are carried to their operating or finger dilating positions, the lugs 16 and 17 on the pad 15 at the base of the handle on the lever mounting disc 12 have less height than the remaining lugs, to clear the handle on the other disc and enable the latter to pass freely over them.

The tool of this invention is particularly well suited for the dilating operations necessary to install the tubular elastic liners or inflations 30 in the rigid outer shells 31 on the teat cups 32 of milking machines. The teat cup illustrated in FIGURE 1 is more or less conventional, and similar to that shown and described in Patent No. 2,997,980 issued to D. O. Noorlander on August 29, 1961. Its outer shell 31, which is made of metal such as stainless steel, has an elongated cylindrical body portion and an enlarged rim portion 33 at its top defining a flat seat 34 normal to the body axis and a retaining flange 35 encircling the seat. The lower end portion of the shell is reduced in diameter to provide a neck 36 that is flared outwardly a slight extent at its extremity.

The liner or inflation 30 has a radially enlarged head 37 on its upper end fitting within the rim on the shell and having its underside firmly sealingly engaged with the seat 34. The other end of the inflation projects from the neck on the shell and is everted thereover to provide a sealed connection between the lower ends of the inflation and the shell. The snug engagement of the everted end portion of the inflation around the outward flare on the neck 36 is relied upon to hold the inflation in a lengthwise stretched condition within the shell and to tension the inflation to an extent assuring proper sealing engagement of its head 37 with the seat 34 on the upper end of the shell.

The enlarged head 37 is first formed on the upper end of the inflation, prior to insertion thereof into the teat cup shell, and involves insertion of a rigid metallic expander ring 39 into the inflation. FIGURE 6 illustrates how this is effected and greatly facilitated through the use of the tool of this invention. The upper end portion of the inflation is telescoped over the fingers 23 on the dilation levers 13 while the latter are in their non-operating or contracted positions seen in FIGURE 2, to bring the inflation into endwise abutting relation with the lever arms 13 at the bases of their fingers. Thereupon, the handles 21 are moved toward one another to impart relative rotary motion to the discs in the finger dilating direction, causing the fingers to expand the upper end portion of the inflation to substantially twice its normal diameter. While the tool is held in this operating condition, an expander ring 39 is passed downwardly through the central holes 14 in the discs and into the space between the dilated fingers 23 until it rests upon the substantially flat upwardly facing surface 40 on the inflation at the bottoms of the fingers 23. The operator's grip upon the handles 21 can then be relaxed to allow the end portion of the inflation to apply contracting force to the fingers and thus, in effect, bias the discs toward their non-operating position seen in FIGURE 2.

It should be noted that those portions of the fingers which oppose the periphery of the expander ring are slanted or beveled, as at 41, to provide cam-like surfaces sloping downwardly and outwardly and which easily allow the fingers to ride up and over the expander ring after the handles are released. When the fingers are withdrawn from the upper end of the inflation, the end portion of the inflation outwardly of the expander ring 39 folds substantially flatwise over the top of the ring to provide a centrally apertured cushion top 42 on the receiving end of the inflation, as seen best in FIGURE 7.

It should also be observed that the fingers 23 provide accurate gauging means that assure placement of expander rings at precisely the same distances inside the upper ends of teat cup inflations, as long as the inflations are bottomed against the lever arms when they are telescoped over the fingers for dilation thereby.

FIGURES 8 through 11 illustrate how the tool of this invention is used to dilate and then evert the other end of the inflation over the neck 36 on the teat cup shell, to achieve the sealed connection between the lower ends of the shell and inflation seen best in FIGURE 12. This, of course, involves insertion of the inflation into the shell to engage its head with the seat 34 on the upper end of the shell. Since the inflation is shorter than the shell, its straight end will not protrude from the necked end of the shell until the inflation is stretched lengthwise, by force applied internally thereto.

For this purpose, a thin metal sleeve 44 of a size to closely fit the inflation is slipped over its straight end portion prior to insertion of the inflation into the shell, and while held in the inverted position seen in FIGURE 8, the shell with the inflation therein is moved downwardly over an upright mandrel 45 having a button-like head 46 on its upper end. The head is more or less rounded and has a diameter slightly larger than that of the interior of the inflation so as to expand it slightly as the inflation slides bodily downwardly over it. Since the inflation cannot expand in that portion thereof which is encircled by the sleeve 44, bodily sliding of the inflation downwardly over the head of the mandrel stops when the lower end of the sleeve is opposite the head, and the continued application of force to the outer shell 31 causes the greater length of the inflation below the head of the mandrel to stretch relative to that portion thereof which is above the mandrel head. Consequently, as the outer shell is forced farther down onto the mandrel, both the sleeve 44 and the adjacent end portion of the inflation emerge from the necked end of the shell. This not only tensions the enclosed portion of the inflation to draw its head into sealing engagement with the seat 34 on the shell, but exposes the end portion of the inflation for dilation and eversion about the necked end of the outer shell. When the shell reaches its lowermost position on the mandrel, its enlarged rim portion is engaged under ledges 48 on the mandrel to hold it in position thereon while the exposed end of the inflation is dilated and everted over the neck on the shell.

The sleeve 44, of course, is removed before the fingers 23 of the dilation tool are inserted into the end of the inflation, as seen in FIGURE 9. FIGURES 10 and 11 illustrate how the end portion of the inflation is first dilated by the fingers 23, and then everted over the necked end of the shell by downward force exerted upon the tool while the fingers hold the inflation dilated. During such application of downward force upon the tool, the dilated end of the inflation is folded downwardly over and around the neck of the shell, and the end of the inflation finally slides off of the ends of the fingers to snap into final position tightly embracing the neck, as seen in FIGURE 12.

From the foregoing description, together with the accompanying drawings, it will be readily apparent that this invention provides a hand operated dilating tool for radially expanding elastic rings and tubes, and which can be employed to greatly simplify the heretofore tedious task of installing inflations in the outer shells of milking machine teat cups.

What is claimed as my invention is:

1. A tool for dilating articles such as elastic rings and tubes, characterized by:
   A. a pair of coaxial annular disc-like members, one of said members providing a lever mounting disc and the other providing a lever actuating disc;
   B. means connecting said members together in flatwise juxtaposition and constraining them to relative rotary motion about their axis;
   C. a number of substantially identical levers slidably confined between the discs and pivotally carried by the lever mounting disc for swinging motion about axes which are equispaced radially from and circumferentially about the disc axis and parallel thereto, said levers extending inwardly from their pivots beyond the edge of the central hole in one of the discs, and having fingers which project axially through said hole;
   D. and means connecting the levers with the lever actuating disc at locations spaced equal distances from their pivots, and operable upon rotary movement of either disc relative to the other to simultaneously impart swinging motion to all of said levers to effect either iris-like dilating or contracting movement to the fingers on the inner ends of the levers depending upon the direction of such relaitve rotary motion of the discs, whereby an elastic tube or ring encircling the fingers can be dilated in consequence of relative rotary motion of the discs in one direction.

2. The tool of claim 1, further characterized by handles on the disc-like members, projecting from their peripheral portions, to enable relative rotary movement to be manually imparted thereto.

3. The tool of claim 1, wherein said connecting means by which the discs are constrained to relative rotary motion about the disc axis comprises:
   A. arcuate guiding surfaces on one of the discs, concentric to the disc axis;
   B. and guide means on the other disc slidingly engaged with said arcuate guiding surfaces.

4. The tool of claim 3, wherein said guide means comprises pivot posts upon which said levers are mounted.

5. The tool of claim 1, further characterized by:
   A. a number of pads fixed to the lever mounting disc and projecting substantially radially outwardly from its periphery beyond the periphery of the lever actuating disc at circumferentially spaced locations;
   B. pivot posts fixed on said pads and having the levers pivotally mounted thereon;
   C. and guide means fixed on said pads slidingly engaged with peripheral portions of the lever actuating disc to hold the discs against separation and to constrain the discs to relative rotary motion about their common axis.

6. The tool of claim 1, wherein each of said levers comprises a substantially straight and flat lever arm confined between the discs and having an elongated slot therein inwardly of its pivot and further characterized by:

A. drive pins fixed in the lever actuating disc and engaged in the slots in the lever arms to effect swinging of the levers about their pivots in consequence of relative rotary motion of the discs.

7. The tool of claim 6, wherein the fingers on the inner ends of the levers engage the edge of the central hole through which they project to limit finger dilating rotary motion of the discs relative to one another; and further characterized by cooperating stops on the discs for preventing finger contracting rotary motion of the discs relative to one another beyond positions at which the lever arms project radially inwardly toward the disc axis.

8. The tool of claim 7, having the following characteristics:
   A. that the holes in the discs are unobstructed except for the inner ends of the levers and their fingers;
   B. handles edgewise connected with adjacent peripheral portions of the discs, for imparting rotation thereto;
   C. that said connecting means by which the discs are constrained to rotary motion about their common axis are remote from the disc axis and comprise guide members on one of the discs slidingly engaging the periphery of the other disc at a number of zones spaced along the circumference of the latter;
   D. and that one of said guide members and the handle on said other disc comprise said cooperating stops.

References Cited by the Examiner
UNITED STATES PATENTS

| | | | |
|---|---|---|---|
| 680,870 | 8/1901 | Leu | 29—235 X |
| 2,408,693 | 10/1946 | Sidebotham | 29—235.5 |
| 2,422,065 | 6/1947 | Anselmi | 29—235 |
| 2,601,547 | 6/1952 | Minock | 29—235 X |

WILLIAM FELDMAN, *Primary Examiner.*

J. C. PETERS, *Assistant Examiner.*